United States Patent
Di Stefano et al.

(10) Patent No.: US 10,654,142 B2
(45) Date of Patent: May 19, 2020

(54) DEVICE AND METHOD FOR CHECKING AND CORRECTING THE POSITION OF AN OPERATING DEVICE WITH RESPECT TO A PIECE

(71) Applicant: Comau S.p.A., Grugliasco (Turin) (IT)

(72) Inventors: Giovanni Di Stefano, Grugliasco (IT); Filippo Navarria, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 336 days.

(21) Appl. No.: 15/543,036

(22) PCT Filed: Jan. 11, 2016

(86) PCT No.: PCT/IB2016/050103
§ 371 (c)(1),
(2) Date: Jul. 12, 2017

(87) PCT Pub. No.: WO2016/113660
PCT Pub. Date: Jul. 21, 2016

(65) Prior Publication Data
US 2018/0001429 A1    Jan. 4, 2018

(30) Foreign Application Priority Data
Jan. 16, 2015   (EP) .................................. 15151387

(51) Int. Cl.
B25J 13/08      (2006.01)
B23Q 15/22    (2006.01)
B21J 15/28     (2006.01)
B25J 19/02     (2006.01)
G05B 19/402   (2006.01)
(Continued)

(52) U.S. Cl.
CPC ............. *B23Q 15/22* (2013.01); *B21J 15/10* (2013.01); *B21J 15/28* (2013.01); *B23K 11/115* (2013.01);
(Continued)

(58) Field of Classification Search
USPC .................................................. 700/245–264
See application file for complete search history.

(56) References Cited

U.S. PATENT DOCUMENTS 3,189,293 A   6/1965 Prager
3,208,657 A   9/1965 Cohn
(Continued)

FOREIGN PATENT DOCUMENTS

DE   3613096 A1   10/1987
DE   19935853 A1   4/2000
(Continued)

OTHER PUBLICATIONS

Stefan Niederer, "Reel Changes on the Fly", Rebuilders, 2012, web page at http://voith.com/en/twogether-article-33-en-27-reel-changes-on-the-fly.pdf.
(Continued)

*Primary Examiner* — Jonathan L Sample
(74) *Attorney, Agent, or Firm* — Young Basile Hanlon & MacFarlane, P.C.

(57) ABSTRACT

A device and method for monitoring and correcting the position and orientation of an operating device (2) with respect to a piece (P). A measuring device (5) including a plurality of sensors (505) connected to the operating device is used to measure through contactless technology the distances of the sensors from a surface ($\pi$) of the piece along respective directions (l, r, s) having given orientations. The sensor measurements are compared to predetermined desired values and the position of the operating device (2) is selectively changed to maintain a desired positional relationship between a main operative axis (X1) of the operative device and operation axis (X2) defined by the surface of the piece.

7 Claims, 5 Drawing Sheets

(51) Int. Cl.
  *B23K 11/25* (2006.01)
  *B23K 11/31* (2006.01)
  *B23K 11/11* (2006.01)
  *B21J 15/10* (2006.01)

(52) U.S. Cl.
  CPC ............ *B23K 11/25* (2013.01); *B23K 11/311* (2013.01); *B23K 11/315* (2013.01); *B25J 13/089* (2013.01); *B25J 19/021* (2013.01); *G05B 19/402* (2013.01); *B23K 11/11* (2013.01); *B23K 11/314* (2013.01); *G05B 2219/37582* (2013.01); *G05B 2219/40555* (2013.01); *G05B 2219/45088* (2013.01); *G05B 2219/49113* (2013.01)

(56) References Cited

U.S. PATENT DOCUMENTS

| | | | |
|---|---|---|---|
| 3,589,957 A | 6/1971 | Cohn | |
| 3,769,124 A | 10/1973 | Johnson | |
| 4,392,291 A | 7/1983 | Iai | |
| 4,410,103 A | 10/1983 | Fuhrmeister | |
| 4,590,578 A * | 5/1986 | Barto, Jr. | B21J 15/10 318/632 |
| 4,673,142 A | 6/1987 | Keene et al. | |
| 4,842,681 A | 6/1989 | Bader et al. | |
| 4,875,633 A | 10/1989 | Mochizuki et al. | |
| 4,934,621 A | 6/1990 | Jacobs | |
| 5,136,873 A | 8/1992 | Hopkins et al. | |
| 5,189,514 A | 2/1993 | Roden | |
| 5,253,819 A | 10/1993 | Butler, Jr. | |
| 5,333,803 A | 8/1994 | Planeta | |
| 5,339,983 A | 8/1994 | Caple | |
| 5,442,155 A | 8/1995 | Nihei et al. | |
| 5,481,085 A | 1/1996 | Kovacevic et al. | |
| 5,515,599 A * | 5/1996 | Best | B23Q 1/5481 29/38 C |
| 5,534,705 A | 7/1996 | Terawaki et al. | |
| 5,570,187 A | 10/1996 | Nihei et al. | |
| 5,691,815 A | 11/1997 | Huber et al. | |
| 5,709,355 A | 1/1998 | Kinnunen et al. | |
| 5,741,096 A | 4/1998 | Olds | |
| 5,762,284 A | 6/1998 | Rautiainen et al. | |
| 5,848,859 A * | 12/1998 | Clark | B23B 39/14 408/1 R |
| 6,164,489 A | 12/2000 | Altrock | |
| 6,301,948 B1 | 10/2001 | Weiland | |
| 6,547,909 B1 | 4/2003 | Butterworth | |
| 6,554,220 B2 | 4/2003 | Gambini | |
| 6,792,987 B2 | 9/2004 | Monroe | |
| 6,812,665 B2 * | 11/2004 | Gan | B25J 9/1692 318/568.11 |
| 7,123,982 B2 | 10/2006 | Mauer et al. | |
| 7,135,083 B2 | 11/2006 | Middelstadt et al. | |
| 7,243,553 B2 * | 7/2007 | Jagiella | H03K 17/9505 73/779 |
| 7,395,606 B2 * | 7/2008 | Crampton | G01B 5/008 33/503 |
| 7,423,734 B1 | 9/2008 | Luik | |
| 7,618,004 B2 | 11/2009 | Gelli et al. | |
| 9,021,677 B1 * | 5/2015 | Burns | B23Q 17/005 29/407.08 |
| 2002/0084260 A1 | 7/2002 | Kubota et al. | |
| 2002/0145031 A1 | 10/2002 | Hirano et al. | |
| 2003/0168548 A1 | 9/2003 | Kinnunen et al. | |
| 2005/0041852 A1 | 2/2005 | Schwarz et al. | |
| 2005/0166413 A1 * | 8/2005 | Crampton | B25J 13/088 33/503 |
| 2006/0156978 A1 * | 7/2006 | Lipson | A61L 27/44 118/708 |
| 2007/0108250 A1 | 5/2007 | Odoni et al. | |
| 2008/0230646 A1 | 9/2008 | Morelli et al. | |
| 2008/0251559 A1 | 10/2008 | Uejima et al. | |
| 2008/0276444 A1 * | 11/2008 | Condliff | B21J 15/02 29/525.06 |
| 2008/0314887 A1 | 12/2008 | Stoger et al. | |
| 2009/0069936 A1 * | 3/2009 | Kock | B23K 11/318 700/254 |
| 2009/0242686 A1 | 10/2009 | Oelen et al. | |
| 2010/0300230 A1 * | 12/2010 | Helmer | B25J 9/106 74/469 |
| 2010/0314362 A1 | 12/2010 | Albrecht | |
| 2010/0326962 A1 | 12/2010 | Calla et al. | |
| 2011/0016939 A1 * | 1/2011 | Clew | B22F 3/1055 72/31.01 |
| 2011/0022229 A1 * | 1/2011 | Jang | B25J 3/04 700/248 |
| 2011/0119897 A1 * | 5/2011 | Hardouin-Finez | B21J 15/10 29/525.06 |
| 2011/0284508 A1 | 11/2011 | Miura et al. | |
| 2011/0320031 A1 * | 12/2011 | Cornelius | B23Q 1/32 700/174 |
| 2012/0234805 A1 * | 9/2012 | Schwarz | B23K 26/03 219/121.63 |
| 2012/0265341 A1 * | 10/2012 | Trompeter | B25J 9/1692 700/254 |
| 2012/0283874 A1 * | 11/2012 | Trompeter | B25J 9/1692 700/254 |
| 2013/0043225 A1 * | 2/2013 | Schurmann | B23K 26/044 219/121.64 |
| 2013/0089642 A1 * | 4/2013 | Lipson | A23P 20/20 426/115 |
| 2013/0123982 A1 * | 5/2013 | Chiu | B25J 9/1692 700/254 |
| 2013/0139397 A1 * | 6/2013 | Jordil | G01B 21/047 33/503 |
| 2013/0166068 A1 * | 6/2013 | Yanagita | G05B 19/4083 700/245 |
| 2013/0325179 A1 * | 12/2013 | Liao | B25J 9/1692 700/254 |
| 2014/0100694 A1 * | 4/2014 | Rueckl | B25J 9/1692 700/254 |
| 2014/0167745 A1 * | 6/2014 | Held | G01B 7/012 324/207.12 |
| 2015/0023748 A1 * | 1/2015 | Carberry | B25J 9/1682 408/1 R |
| 2015/0101175 A1 | 4/2015 | Xi et al. | |
| 2015/0314450 A1 * | 11/2015 | Chiu | B25J 9/1692 700/186 |
| 2015/0314888 A1 * | 11/2015 | Reid | B25J 9/1687 700/117 |
| 2015/0321338 A1 * | 11/2015 | Parks | B25J 7/00 414/800 |
| 2016/0082598 A1 * | 3/2016 | Anducas Aregall | B25J 19/022 382/153 |
| 2016/0096245 A1 * | 4/2016 | Ramirez Alcala | B25J 9/1694 29/466 |
| 2016/0175976 A1 * | 6/2016 | Denis | G01S 5/18 219/130.1 |
| 2017/0120373 A1 * | 5/2017 | Edwards | B23K 20/1205 |

FOREIGN PATENT DOCUMENTS

| | | |
|---|---|---|
| DE | 19930087 A1 | 1/2001 |
| DE | 102009058817 | 8/2010 |
| EP | 2647450 A1 | 10/2013 |
| JP | H0523851 A | 2/1993 |
| WO | 9301014 A1 | 1/1993 |
| WO | 03086695 A1 | 10/2003 |
| WO | 2005005089 A1 | 1/2005 |
| WO | 2005095043 A1 | 10/2005 |
| WO | 2010000534 A1 | 1/2010 |

OTHER PUBLICATIONS

Voith, "FlyingSplice for fully automatic reel change", May 27, 2013, video at http://www.youtube.com/watch?v=2niHex-hHN8.
Notification of Transmittal of the International Search Report and the Written Opinion of the International Searching Authority, or the Declaration, dated May 21, 2014.

(56) References Cited

OTHER PUBLICATIONS

European Search Report, EP Application No. 14749030.4, dated 7 Sep. 7, 2016.
International Search Report and Written Opinion of the International Searching Authority in a related matter, dated Jul. 11, 2014.
LMI Technologies, Inc. Gocator 2000 Series Data Sheet.
International Search Report and the Written Opinion of the International Searching Authority, in a related matter, dated Jul. 24, 2015.
CIMTEC Automation Blog, "LMI Technologies Announces Gocator Firmware Release 3.3", Friday, May 11, 20 12, http://b log. cimtecauto mation.com/lm i-tech nologies-announces-gocato r-fi rmware-re lease-3-3.

* cited by examiner

DEVICE AND METHOD FOR CHECKING AND CORRECTING THE POSITION OF AN OPERATING DEVICE WITH RESPECT TO A PIECE

FIELD OF THE INVENTION

The present invention relates to systems and methods for checking and correcting the position of an operating device with respect to a piece.

BACKGROUND OF THE INVENTION

The expression "operating device" is used in the present description and in the appended claims to indicate any device, implement, or tool that can be used in an industrial plant for carrying out an industrial operation.

A specific application that is described herein is that of a riveting device carried by a manipulator robot and designed to apply joining rivets on sheet-metal elements, for example in a motor-vehicle assembly line. A further example of application of the invention is that of an electric spot-welding gun carried by a manipulator robot or just simply a welding gun controlled manually by an operator. Yet a further example is constituted by a roller-hemming device carried by a manipulator robot.

In any application of the type referred to above there exists the problem of positioning and orienting the operating device properly with respect to the workpiece. Specifically, reference is here made to the case where the operating device has a main operative axis, having a predetermined position and orientation with respect to the operating device, and the piece has a surface that defines a preferential axis along which the operation must be performed, here referred to as "operation axis", having a predetermined position and orientation with respect to the aforesaid surface of the piece.

In the case, for example, of a riveting device, it is in general necessary for the main operative axis of the device, corresponding to the direction of application of the rivet, to be orthogonal, within a predetermined margin of error, with respect to the surface portion of the piece (for example, an element of sheet metal) on which the operation itself is carried out. Likewise, in the case of a welding gun or in the case of a roller-hemming head, it is necessary for the tool to be correctly oriented with respect to the piece.

In the specific case of a motor-vehicle assembly line, the problem of proper orientation of an operating device, such as for example a riveting device or a welding gun, or a roller-hemming head, is rendered more complicated by that the sheet-metal constituting the structures to be processed may present a non-uniform quality, so that, even if the operating device is precisely positioned during preliminary set-up of the installation, defects may occur during normal production in the final produced structures.

SUMMARY OF THE INVENTION

The object of the present invention is to provide a checking device of universal use, which can be associated by simple and quick operations to any operating device and which will enable performing in real time, prior to execution of the operation on each single piece (or, if preferred, periodically on a piece of each predetermined batch of pieces), a checking operation on position and orientation of the operating device with respect to the piece and also, if necessary, a correction of the position and/or orientation of the operating device, so as to ensure the necessary quality of the operation.

With a view to achieving the above object, the subject of the invention is a device for checking and correcting the position of an operating device with respect to a piece, wherein the operating device has a main operative axis, having a predetermined position and orientation with respect to the operating device;

wherein the piece has a surface that defines an operation axis having a predetermined position and orientation with respect to said surface of the piece; and wherein an apparatus is provided for positioning the operating device and/or the piece, which is able to modify the position and/or orientation of the operating device with respect to the piece, said position checking and correcting device being characterized in that it comprises:

a measuring device, which can be associated to the operating device and carries one or more sensors at given positions with respect to the operating device, said sensors being adapted to measure, by means of a contactless technology, distances of the sensors from said surface of the piece, along respective directions having given orientations;

first electronic processing means configured for processing measurement values detected by said contactless sensors so as to obtain a value of at least one angle indicating the orientation of said main operative axis of the operating device with respect to said operation axis defined by the piece; and second electronic control means, adapted to use an information coming out from said first electronic processing means for generating, if necessary, a control signal that is used by said positioning apparatus for positioning said operating device according to a desired orientation with respect to the piece.

In a preferred embodiment, the above mentioned measuring device comprises a supporting structure, which can be associated in a given position to the operating device, and at least three sensors for contactless distance measurement, which are carried in given positions by said supporting structure and are adapted to detect measurement values of respective distances from the surface of the piece, along at least three respective measuring directions. More specifically, in the aforesaid exemplary embodiment, the above supporting structure can be removably associated to the operating device in a position where said sensors are distributed about said main operative axis of the operating device, with the aforesaid three measuring directions that are mutually convergent towards the surface of the piece.

Once again in the case of the preferred exemplary embodiment, the supporting structure comprises a sensor-carrying portion, having walls for carrying the aforesaid sensors which are adapted to surround at a distance, on two or more sides, the operating device, and an attachment portion, which is adapted to be secured to an element carried by the automated apparatus used for positioning the operating device, said attachment portion supporting said sensor-carrying portion in a cantilever fashion.

Once again in the case of the preferred exemplary embodiment, the automated positioning apparatus is a manipulator robot carrying the operating device and provided with an electronic controller.

In this case, preferably the aforesaid first electronic processing means and second electronic control means are both incorporated within the controller of the robot. Not, however, ruled out is a solution in which the first electronic processing means are, instead, incorporated in the aforesaid sensors or in any case in the aforesaid measuring device including the sensors.

Thanks to the above characteristics, the invention enables the problem of a continuous and effective checking of proper positioning of an operating device during normal production on a production line to be solved in a simple and effective way.

The device according to the invention is of universal use given that it can be associated in a simple and fast way to any operating device. It enables performing in real time, prior to execution of the operation on each single piece (or if so preferred periodically on a piece of each predetermined batch of pieces), a check on the position and orientation of the operating device with respect to the piece, and moreover makes possible immediate execution, if necessary, of a correction of the position and/or orientation of the operating device, in order to guarantee the necessary quality of operation.

Positioning of the supporting structure carrying the sensors with respect to the operating device can be carried out also in a non-precise way in so far as the system can be calibrated during a setting-up stage by storing in the memory a "zero" position of the system in which the electronic control means detect proper orientation of the main axis of the operating device.

Of course, the type of sensors used and the way in which they are prearranged in association with the operating device may vary widely with respect to what has been illustrated herein purely by way of example.

The subject of the invention is also a method for checking and correcting the position of an operating device.

BRIEF DESCRIPTION OF THE DRAWINGS

Further characteristics and advantages of the invention will emerge from the following description with reference to the annexed drawings, which are provided purely by way of non-limiting example and in which.

DETAILED DESCRIPTION

Figure 1:
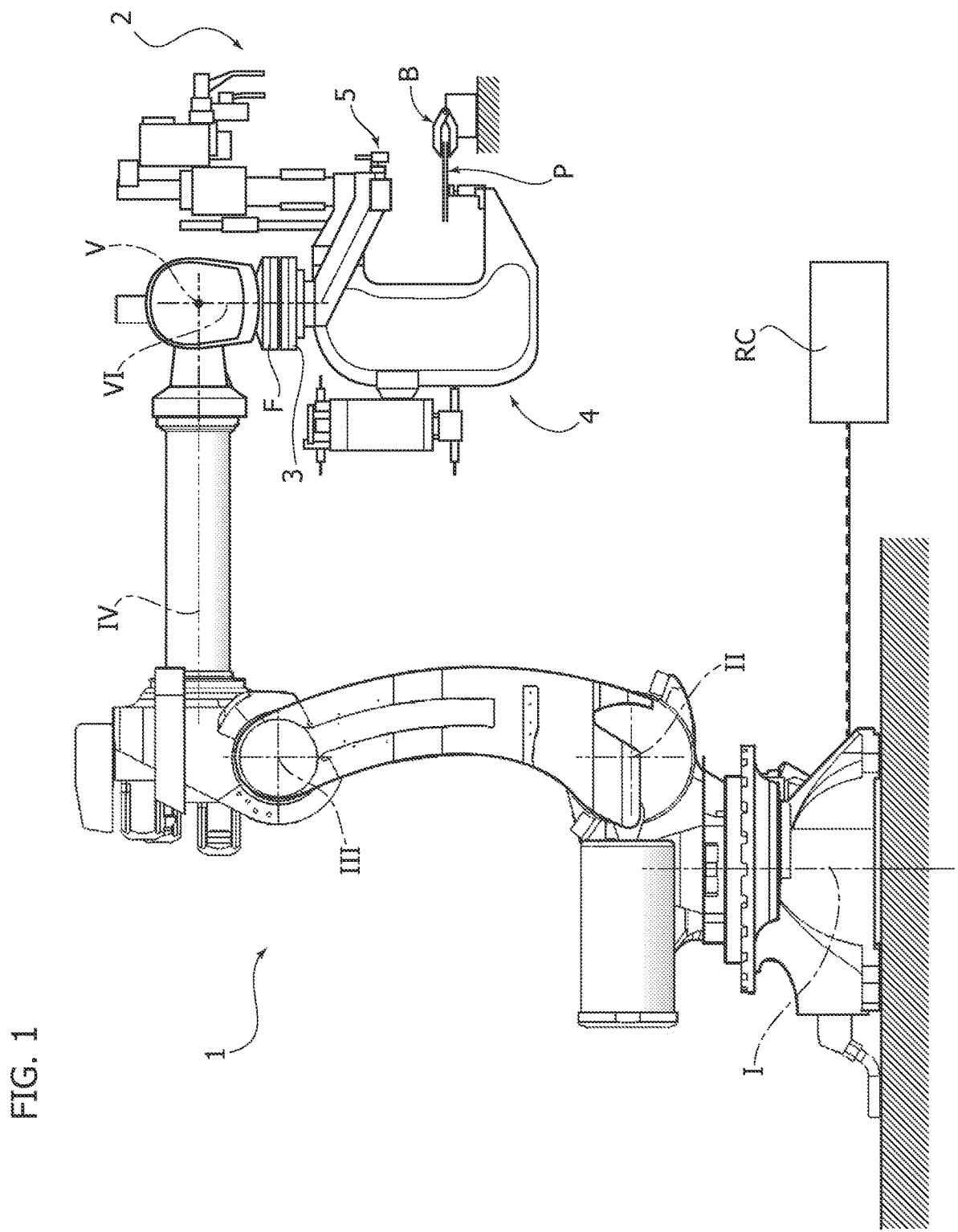
FIG. 1 is a schematic view of a manipulator robot carrying a riveting device to which a checking and positioning device according to the invention is associated.

With reference to FIG. 1, number 1 generally designates a manipulator robot of any known type carrying an exemplary riveting device 2. According to the conventional art, the manipulator robot 1 comprises a chain of elements mutually articulated about a plurality of axes I, II, III, IV that terminates with a robot wrist articulated about two mutually perpendicular axes V, VI. The proximal element of the chain of elements constituting the manipulator robot 1 is a flange F, connected to which is the attachment flange 3 of a C-shaped frame 4 constituting the supporting structure of the exemplary riveting device 2.

According to the conventional art, the various elements constituting the manipulator robot 1 are controlled by electric motors, driving of which is controlled by a robot controller RC so as to displace, position, and orient the riveting device 2 in any desired way.

In the case of the example illustrated, the riveting device 2 is designed to apply joining rivets to sheet-metal elements constituting the piece P on which the riveting device operates. During execution of the operation, the elements constituting the piece P are clamped in position by any clamping tool B suited for the purpose (illustrated only schematically in FIG. 1).

Figure 2:
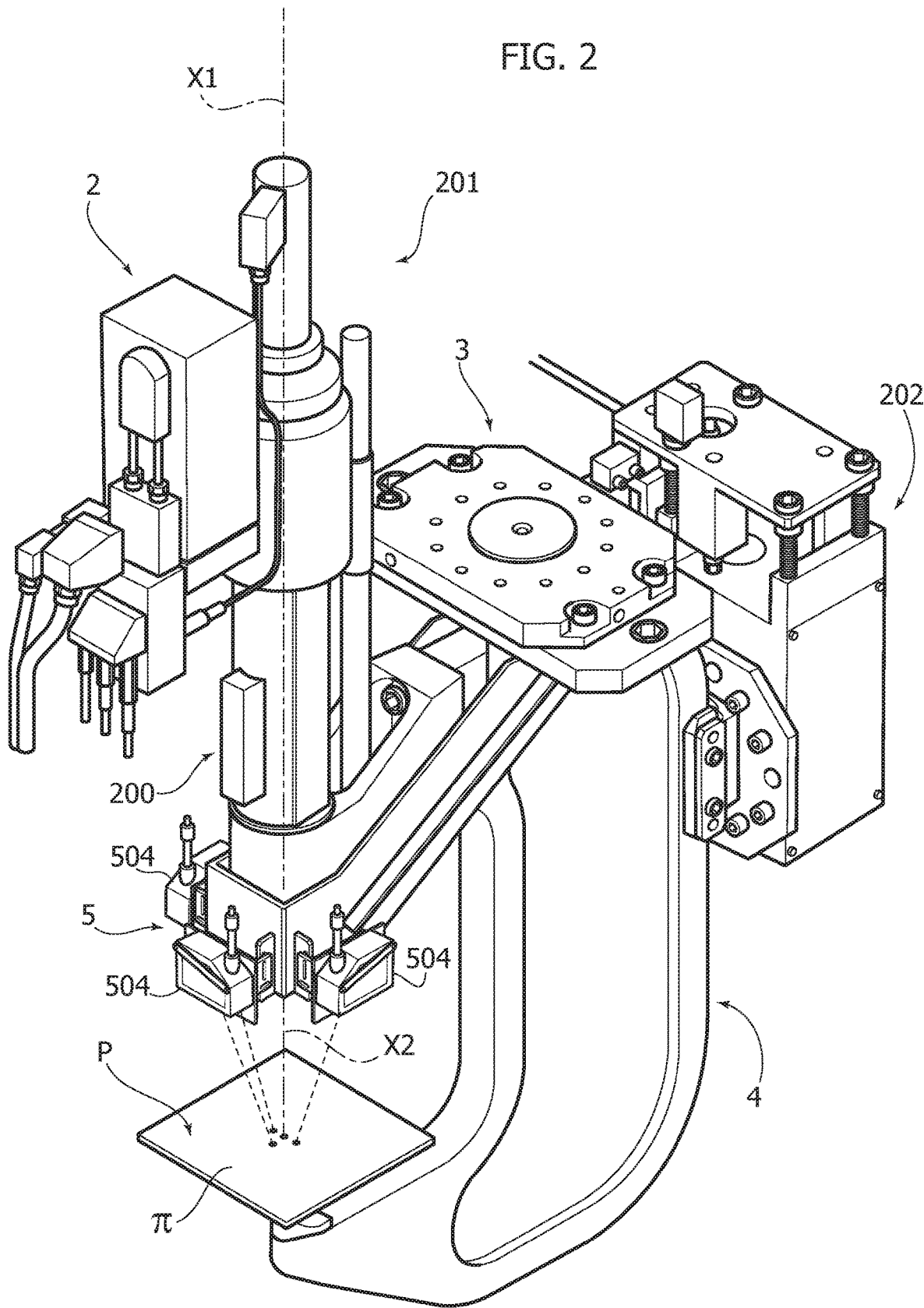
FIG. 2 is a perspective view at an enlarged scale of the riveting device of FIG. 1, to which the checking and positioning device according to the invention is associated.

FIG. 2 illustrates the exemplary riveting device 2 at an enlarged scale. The details of construction of this device are not described herein, since they can be made in any known way and also in so far as they do not fall, taken in themselves, within the scope of the present invention. In general, the riveting device 2 comprises a cylindrical body 200, associated to which is a pneumatic actuator 201 that receives in succession the rivets (not shown) to be applied from a rivet reservoir 202 and applies them on the sheet-metal elements constituting the piece P, feeding them in a direction X1 that defines the main operative axis of the riveting device 2.

The rivets are applied on a plane surface portion $\pi$ of the piece P, which defines a preferential axis X2 of execution of the operation, here referred to as "operation axis". In the case of the application illustrated, the operation axis X2 is typically an axis orthogonal to the surface $\pi$.

In general, proper execution of the riveting operation requires the main operative axis X1 of the riveting device 2 to have a given position and/or orientation with respect to the operation axis X2 defined by the surface of the piece. In the specific example illustrated in the annexed drawings, main operative axis X1 must be substantially coincident with operation axis X2.

Figure 3:
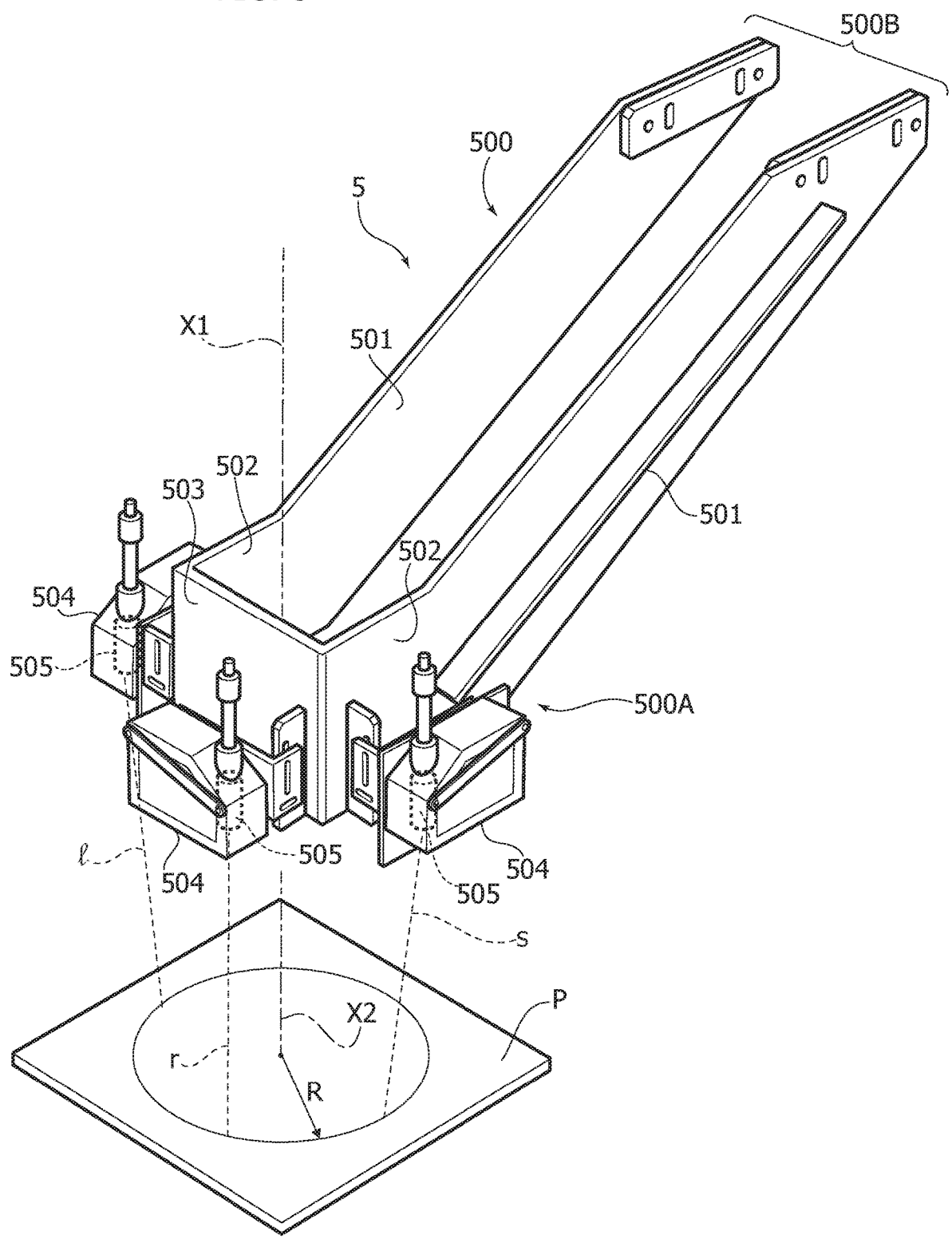
FIG. 3 is a perspective view at an enlarged scale of the checking and positioning device according to the invention.

According to the illustrated example of the invention, associated to the riveting device 2 is a measuring device 5 which is used for checking and correcting the position of the exemplary riveting device 2. This device 5 is more clearly visible in FIG. 3. With reference to the example illustrated in FIG. 3, the device 5 includes a supporting structure 500 that is rigidly connected to the C-shaped frame 4 of the operating device 2, adjacent to the attachment flange 3.

Once again with reference to the specific example illustrated, the supporting structure 500 includes two parallel planar plates 501 spaced apart from each other, with top ends having holes for engagement of screws for attachment to the two sides of the C-shaped frame 4. The bottom end portions 502 of the plates 501 are rigidly connected together by a front plate 503. The structure constituted by the aforesaid end portions 502 and by the front plate 503 is set in three mutually orthogonal planes about the main operative axis X1 of the device. Each of the three planes defined by the end portions 502 of the plates 501 and by the front plate 503 carries a respective sensing unit 504, each of which includes a distance sensor 505 (illustrated in FIG. 3), which, in the case of the example described herein, is constituted by an optical laser sensor of any known type, operating in reflection. Any other known type of distance sensor operating with contactless technology may also be used.

As may be seen, the supporting structure 500 therefore comprises a sensor-carrying portion 500A, constituted by the walls of bottom end portions 502, and front plate 503 that surround the operating device 2 at a distance, on two or more sides, and an attachment portion 500B (constituted, in the example illustrated, by the attachment ends of the plates 501), which is secured to an element, for example attachment flange 3, which is selectively connected to the apparatus (in the specific case, the robot 1) through, for example flange F, that carries the operating device and which is designed to support the sensor-carrying portion in a cantilever fashion 500A.

Thanks to the above described arrangement, the measuring device 5 according to the invention can be easily adapted on any operating device, at most upon modifying the conformation of the supporting structure 500.

Figure 4:
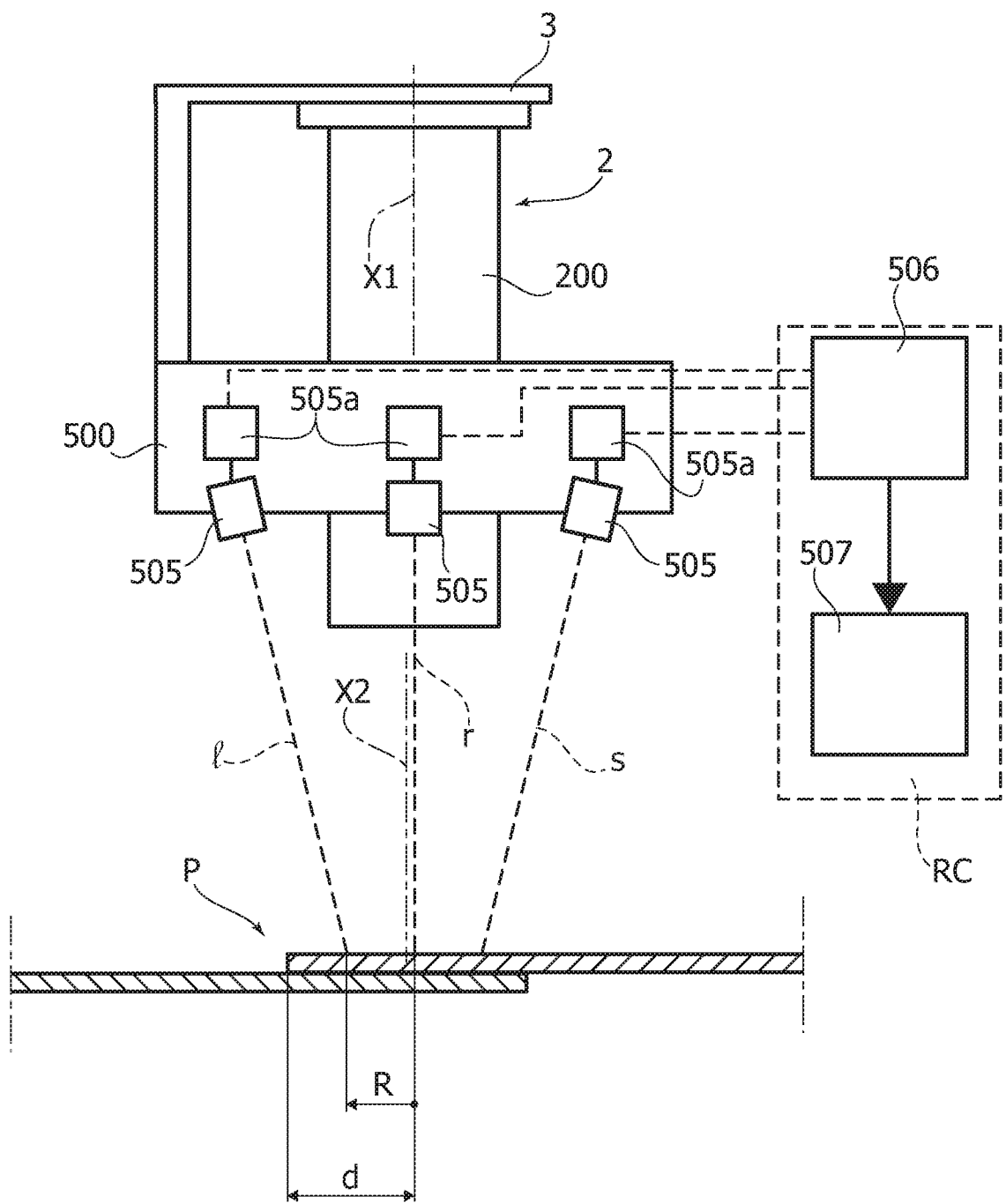
FIG. 4 is a schematic diagram of the device according to the invention.

Referring to FIG. 4, each unit 504 includes an electronic card 505a designed to receive the signals coming out from the respective sensor 505 and to send them to an electronic processing unit 506 (see FIG. 4) configured for processing the information coming out from the sensors 505. With reference once again to FIG. 4, the three sensors 505 operate in three respective directions l, r, s and are designed to detect the distances of each of the sensors themselves from the plane π, along the respective operating direction. In the example illustrated, the three sensors 505, arranged about the main operative axis X1, are oriented in directions l, r, s slightly convergent in the direction of the piece P. In any case, the theoretical points of intersection of the directions l, r, s with the plane π of the piece P are located along a circumference the radius R of which (see FIG. 4) is less than the minimum distance d that must be maintained between the main operative axis X1 of the operating device and the edge of the piece P for the riveting operation to be carried out properly.

The unit 504 associated to the three sensors 505 sends the information regarding the respective measurements to the electronic processing unit 506. The electronic unit 506 is configured for processing this information in order to obtain an information on the orientation of the main operative axis X1 of the operating device 2 (the position of the sensors 505 relative thereto being known from a dedicated calibration operation) with respect to the operation axis X2 defined by the piece P (i.e., in the example illustrated, the operation axis X2 orthogonal to the plane surface π). The orientation of main operative axis X1 with respect to operation axis X2 is defined by one or more angles that the processing unit 506 is able to determine on the basis of the measurements made by the sensors 505.

According to the most general arrangement, the information coming out from the processing unit 506 is used in an electronic control unit 507 for generating, if necessary, a signal for controlling the apparatus 1 for positioning the operating device 2 in order to orient this device correctly.

In the case of the embodiment illustrated, however, both the electronic processing unit 506 (which calculates the angle of inclination of the main operative axis X1 with respect to the operation axis X2 on the basis of the measurements made by the sensors 505) and the electronic control unit 507 (which carries out correction of the position of the operating device 2) are incorporated in the robot controller RC.

In a variant, the processing unit 506 is, instead, integrated in the unit 504 and/or is associated to the structure 500 for supporting the sensors, whereas the unit 507 is integrated in the robot controller RC.

According to one example of the invention, immediately prior to operation on each single piece P, or alternately, if so preferred, periodically on one piece P of each predetermined batch of pieces P, the measuring device 5 is activated to enable the electronic unit 506 to receive the measurements made by the sensors 505 and to process them so as to calculate the value of at least one angle of inclination of the main operative axis X1 of the exemplary riveting device 2 with respect to the operation axis X2 defined by the piece P. If the retrieved inclination angle does not coincide with the desired value within a predetermined margin of error, the information generated by the electronic processing unit 506 is used by the unit 507 for positioning and orienting the riveting device correctly, through a closed-loop control. As already mentioned, in the embodiment illustrated herein the functions of units 506, 507 are all performed by the robot controller RC.

As emerges clearly from the foregoing description, the device according to the invention may be easily and rapidly applied to the operating device 2 in order to enable it to control itself in real time in order to ensure proper execution of any operation.

As already mentioned, application to an operating device 2 in the form of a riveting device carried by a manipulator robot 1 is here provided purely by way of example.

Figure 5:
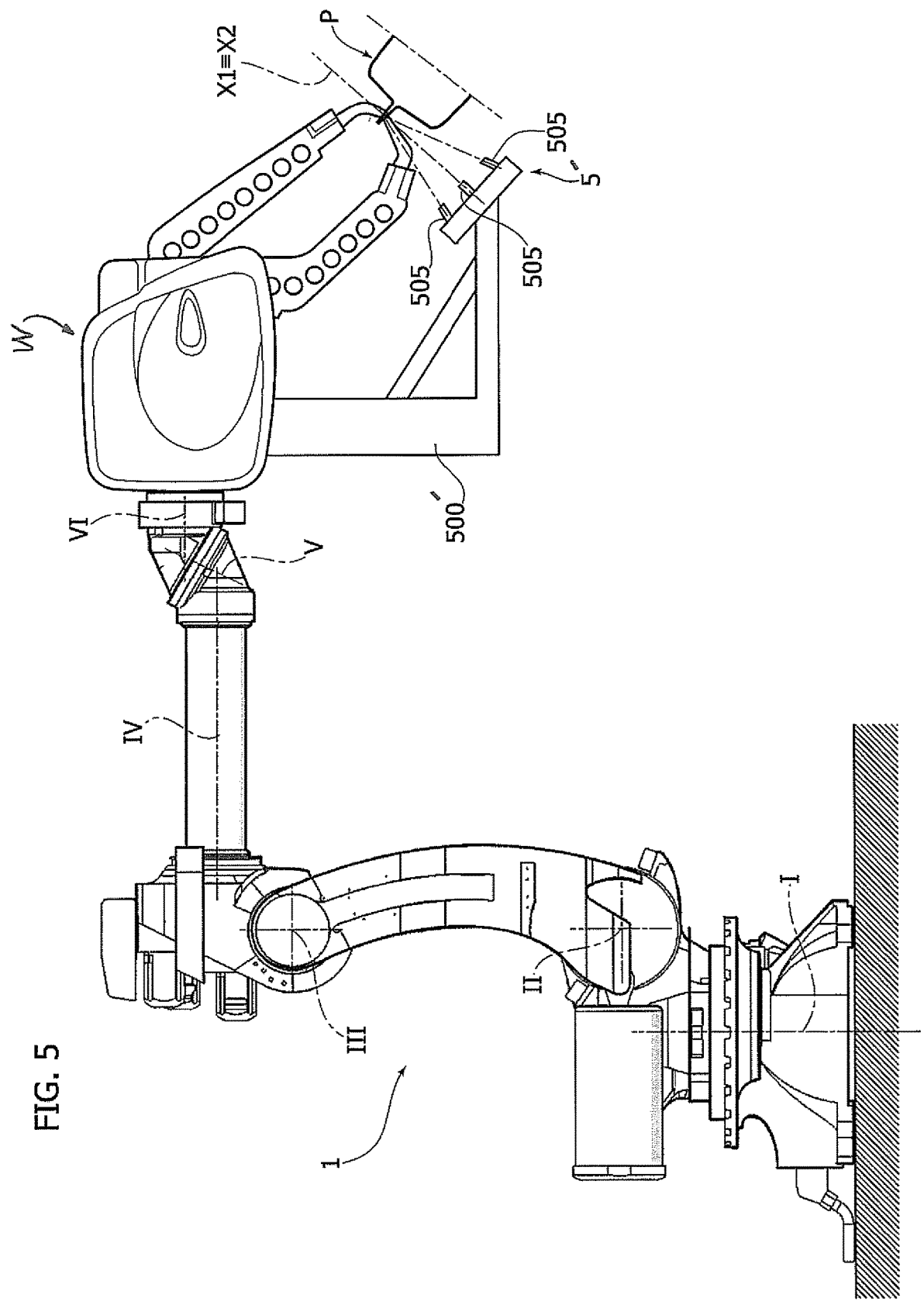
FIG. 5 is a schematic variant of FIG. 1 that shows application of the invention to a manipulator robot equipped with an electric spot-welding gun.

FIG. 5 illustrates an alternative variant in which the measuring device 5' according to the invention is carried by a supporting structure 500' associated to an electric spot-welding gun W, carried by a manipulator robot 1. In this case, the main operative axis X1' of the operating device 2 is the axis along which the two electrodes of the gun W press between them two sheet-metal elements constituting the structure of the piece P to be welded. The operation axis X2' is the axis orthogonal to the two flanges of sheet metal to be welded (as generally illustrated).

An alternative application similar to that of FIG. 5 is that of a manipulator robot carrying a roller-hemming head (not shown).

As likewise already mentioned, the invention may, however, be applied to any other operating device 2, also in the case where it is controlled manually by an operator.

Of course, without prejudice to the principle of the invention, the details of construction and the embodiments may vary widely with respect to what has been described and illustrated herein purely by way of example, without thereby departing from the scope of the present invention.

The invention claimed is:

1. A system for monitoring and correcting the position of an operative device relative to a piece, the system comprising:
   a multi-axis manipulator device (1) having a connector flange (F) and a controller (RC) operative to position the connector flange in selected predetermined three dimensional coordinate positions;
   an operating device (2) connected to the manipulator device flange (F) having a main operative axis (X1);
   a measuring device (5) removably connected to the operating device (2), the measuring device further comprising:
   a plate (501,503) removably connected to the operating device (2);
   a distance sensor (505) connected to the plate, the sensor operable to project a beam to a piece plane surface portion (π) to measure a distance between the distance sensor and the piece plane surface portion;
   a first processor (506) in electronic communication with the distance sensor, the first processor operable to receive information from the distance sensor and calculate an angle indicating an angular orientation differential value between the main operative axis (X1) to an operation axis (X2) defined by the piece plane surface portion (π); and
   a second processor (507) in electronic communication with the first processor and the manipulator device controller (RC), the second processor operative to selectively change the locational position of the operative device (2) through movement of the manipulative device (1) such that the main operative axis (X1) coincides with the operation axis (X2) to maintain a desired orientation between the operating device (2) and the piece (P) during production operation.

2. The system of claim 1 wherein the plate further comprises a pair of side plates (501) and a front plate respectively positioned about three different sides of the main operative axis; and the sensor comprises three sensors, each of the three sensors connected to a respective side or front plate along respective directions (l, r, s) having predetermined orientations, each beam of the respective sensor convergent toward the piece plane surface portion and the operation axis (X2).

3. The system of claim 2 wherein a theoretical points of intersection of the directions (l, r, s) with the piece plane surface portion are located along a circumference having a radius (R) having a value less than a distance (d) defined by a predetermined distance between the main operative axis (X1) and an edge of the piece (P).

4. The system of claim 3 wherein the distance sensors, the first processor, the second processor and the manipulator controller continuously measure and selectively adjust the position of the operative device (2) relative to the piece to maintain coincidence of the main operative axis (X1) to the operation axis (X2).

5. The system of claim 3 wherein the operative device (2) is a riveting device.

6. The system of claim 3 wherein the operative device (2) is a spot welding gun (W).

7. The system of claim 3 wherein multi-axis manipulator comprises a programmable industrial robot.

* * * * *